UNITED STATES PATENT OFFICE.

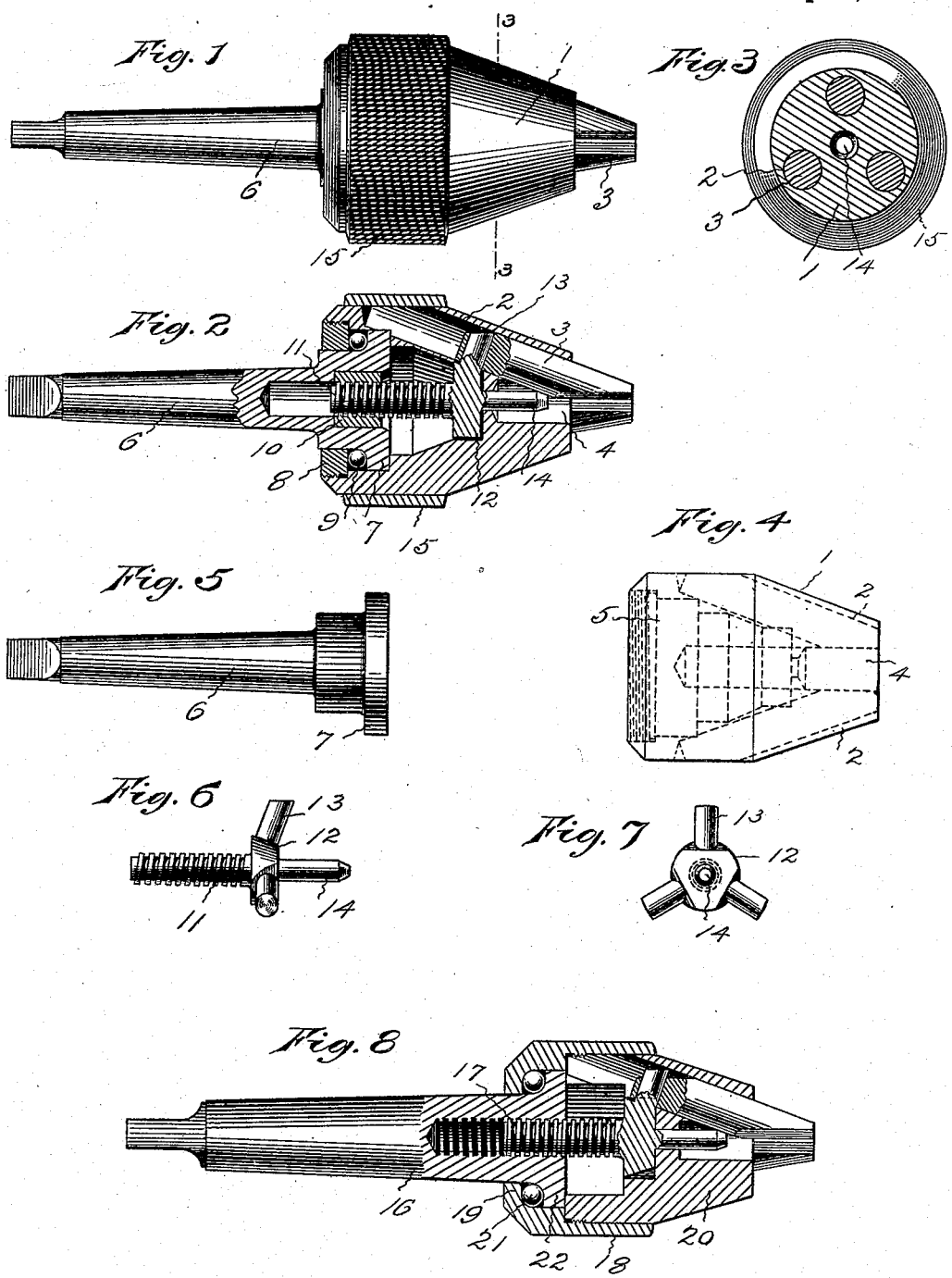

ARTHUR I. JACOBS, OF HARTFORD, CONNECTICUT, ASSIGNOR TO THE JACOBS MANUFACTURING COMPANY, OF HARTFORD, CONNECTICUT, A CORPORATION OF CONNECTICUT.

CHUCK.

933,179.   Specification of Letters Patent.   Patented Sept. 7, 1909.

Application filed March 9, 1908. Serial No. 419,900.

*To all whom it may concern:*

Be it known that I, ARTHUR I. JACOBS, a citizen of the United States, residing at Hartford, in the county of Hartford and State of Connecticut, have invented a new and useful Chuck, of which the following is a specification.

This invention relates to a chuck for a drill press, lathe or other boring machine of the class commonly termed an automatic chuck, that is, one which tends to tighten and increase its grip on the shank of the drill, bit, or other tool under the strain incident to the resistance of the work to the rotation of the tool.

The object of the invention is to produce a simple, cheap and strong article of this nature which is easily and quickly manipulated for gripping and releasing the shank of a tool and which is so constructed that the same length of tool shank is always gripped regardless of the diameter of the tool, and which has the jaw end so arranged as to exclude chips and dirt.

Figure 1 of the accompanying drawings shows a side view of a chuck that embodies the invention. Fig. 2 shows a central longitudinal section of the chuck. Fig. 3 shows a transverse section on the plane indicated by the dotted line 3—3 on Fig. 1. Fig. 4 shows a side view of the body. Fig. 5 shows a side view of the stem. Fig. 6 shows a side view of the jaw moving spindle. Fig. 7 shows an end view of the jaw moving spindle. Fig. 8 shows a central longitudinal section of a modified construction of the chuck.

The body 1 of this chuck has a cylindrical section and a frusto-conical section with inclined sockets 2. There may be any desired number of these sockets, but it is preferred to have three as illustrated in the drawings for the purpose of receiving the three chuck jaws 3. In the tapering end of the body is a recess 4 for receiving the shank of a tool, and in the other end is a chamber 5 for receiving the jaw moving spindle and the head of the stem.

The stem 6, which may be tapered or straight as desired, has a flanged head 7 which fits and has a rotary movement within the chamber in the cylindrical portion of the body. The outer end of the wall of the stem chamber is threaded and screwed therein is a ring 8. Between this ring and the back side of the flanged head of the stem are balls or rolls 9.

A nut 10 is preferably inserted into a socket in the head end of the stem. If desired, however, instead of forming this nut separately and forcing it into a socket in the stem a thread may be cut directly in the walls of the socket. The spindle 11 has a thread that fits the thread of the nut and has a flange 12 with three radially projecting studs 13 that extend into holes made in the jaws. The spindle also has a stem 14 that extends forwardly into the recess for the tool shank in the tapered end of the body.

A sleeve 15 is slipped upon the cylindrical portion of the body and this sleeve may be knurled or milled in any manner for the purpose of providing a grip or for ornamentation.

To clamp the shank of a tool thrust between the jaws the stem is held stationary and the body rotated backwardly, or the body is held stationary and the stem rotated forwardly. This causes the nut in the head of the stem to advance the spindle which by means of its studs forces the jaws outwardly and causes them to contract and grip the shank of the tool. To loosen the tool the body of the chuck is turned forwardly while the stem is held stationary, or the stem is turned backwardly while the body is held stationary. This draws back the spindle and draws in the jaws causing them to open. The rotation of one of these parts with relation to the other is easily and quickly accomplished for on account of the employment of the balls or rolls between the parts subject to strain the friction is reduced to a minimum, consequently a very tight grip can be obtained by the jaws upon the shank of the tool by the application of a comparatively little force.

The forwardly projecting stem of the spindle always bears the same relation to the jaws and consequently the shank of the tool can always be thrust back between the jaws until its end engages the end of the stem, then the jaws will always grip the same length of the shank of the tool, whereas if this part were not used the shank of a small tool would very likely be thrust farther in than could be the shank of a large tool. The forward end of this chuck is so constructed that there is no chance for chips or particles of metal cut or abraded from the work to get into the interior and obstruct its working and cause wear.

In the modified form of the invention that is shown the stem 16 has a thread cut in its interior wall for receiving the threaded part of the spindle 17 which moves the jaws inwardly and outwardly, and the sleeve 18 in this instance is provided with a flange 19 on its back and with a thread in its interior that screws upon the exterior thread on the end of the body 20 for holding the parts together. In this form the balls 21 are arranged between the flanged end of the sleeve and the head 22 of the stem.

In both of the forms shown the threads of the spindle are so arranged that the resistance of the tool to rotation which is caused by the resistance of the stock being cut tends to hold the jaws and the body backwardly with relation to the direction of rotation of the stem which is driven by the machine and thus cause the jaws to be forced outwardly and so grip the shank of the tool more tightly as the machine is operated.

The invention claimed is:

1. A chuck having a body with a chamber that has a perforated wall at its forward end and axially inclined sockets in the body and extending through said wall, a stem with a head located in said chamber and movable rotarily only with relation to the body, jaws movable longitudinally in and retained by the walls of said sockets, a spindle with a thread engaging a threaded recess in the stem, means projecting from the spindle and engaging the jaws for moving them longitudinally, and a stem projecting forwardly from the spindle through the wall in the body and closing the perforation therein to form an abutment for the end of a drill and prevent the entrance of chips and dust into the chamber in the body, substantially as specified.

2. A chuck having a body with a chamber and circular sockets that extend at an angle with the axis of the body, circular jaws fitting and movable longitudinally in said sockets, each jaw having a perforation near its rear end and a threaded spindle having a flanged end and studs projecting at an angle from said flange into the perforations in the jaws, substantially as specified.

ARTHUR I. JACOBS.

Witnesses:
JOSEPHINE M. STREMPFER,
HARRY R. WILLIAMS.